US012631751B2

(12) United States Patent
Qi et al.

(10) Patent No.: US 12,631,751 B2
(45) Date of Patent: May 19, 2026

(54) COMPRESSING LIDAR RANGE IMAGES

(71) Applicant: Waymo LLC, Mountain View, CA (US)

(72) Inventors: Ruizhongtai Qi, Mountain View, CA (US); Yin Zhou, San Jose, CA (US); Xuanyu Zhou, Santa Clara, CA (US); Dragomir Anguelov, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 697 days.

(21) Appl. No.: 17/960,776

(22) Filed: Oct. 5, 2022

(65) Prior Publication Data

US 2023/0105257 A1    Apr. 6, 2023

Related U.S. Application Data

(60) Provisional application No. 63/252,612, filed on Oct. 5, 2021.

(51) Int. Cl.
 *G01S 17/89* (2020.01)
 *G01S 7/00* (2006.01)
 *G06V 10/82* (2022.01)
(52) U.S. Cl.
 CPC .............. *G01S 17/89* (2013.01); *G01S 7/003* (2013.01); *G06V 10/82* (2022.01)
(58) Field of Classification Search
 None
 See application file for complete search history.

(56) References Cited

U.S. PATENT DOCUMENTS

2020/0217950 A1*  7/2020  Unnikrishnan ....... G01S 17/931
2022/0163346 A1*  5/2022  Han ..................... G06V 20/588
2023/0252662 A1*  8/2023  Nikitidis ............... B29C 64/393
                                                              382/103

OTHER PUBLICATIONS

Aaron Van Oord et al., "Pixel recurrent neural networks," Proceedings of The 33rd International Conference on Machine Learning, 2016, 48:1747-1756.
Ball'e et al., "End-to-end optimized image compression," CoRR, Nov. 5, 2016, arXiv:1611.01704, 27 pages.
Ball'e et al., "Variational image compression with a scale hyperprior," CoRR, Feb. 1, 2018, arXiv:1802.01436, 23 pages.
Behley et al., "Semantickitti: A dataset for semantic scene understanding of lidar sequences," Proceedings of the IEEE International Conference on Computer Vision, 2019, pp. 9297-9307.
Biswas et al., "MuSCLE: Multi Sweep Compression of LiDAR using Deep Entropy Models," CoRR, Nov. 15, 2020, arXiv:2011.07590, 22 pages.
Botsch et al., "Efficient high quality rendering of point sampled geometry," Thirteenth Eurographics Workshop on Rendering, 2002, 12 pages.
Devillers et al., "Geometric compression for interactive transmission," Proceedings Visualization 2000. VIS 2000 (Cat. No. 00CH37145), Oct. 8-13, 2000, pp. 319-326.

(Continued)

*Primary Examiner* — Walter L Lindsay, Jr.
*Assistant Examiner* — Geoffrey T Evans
(74) *Attorney, Agent, or Firm* — Fish & Richardson P.C.

(57) ABSTRACT

Methods, systems, and apparatus, including computer programs encoded on a computer storage medium, for performing data compression and data decompression on lidar range images.

23 Claims, 4 Drawing Sheets

(56) References Cited

OTHER PUBLICATIONS

Geiger et al., "Vision meets robotics: The kitti dataset," The International Journal of Robotics Research, Aug. 32, 2011, 32(11):1231-1237, Sep. 1, 2013.

Github.com [online], "Google/Draco," Nov. 16, 2017, retrieved on Aug. 4, 2023, retrieved from URL<https://github.com/google/draco/releases?page=2/>, 2 pages.

Graziosi et al., "An overview of ongoing point cloud compression standardization activities: video-based (v-pcc) and geometry-based (g-pcc)," APSIPA Transactions on Signal and Information Processing, Apr. 3, 2020, 17 pages.

He et al., "Deep residual learning for image recognition," Proceedings of the IEEE conference on computer vision and pattern recognition, 2016, pp. 770-778.

Houshiar et al., "3D point cloud compression using conventional image compression for efficient data transmission," 2015 XXV International Conference on Information, Communication and Automation Technologies (ICAT), Oct. 29, 2015, 8 pages.

Huang et al., "OctSqueeze: Octree-structured entropy model for lidar compression," Proceedings of the IEEE/CVF Conference on Computer Vision and Pattern Recognition (CVPR), 2020, pp. 1313-1323.

Lang et al., "PointPillars: Fast encoders for object detection from point clouds," Proceedings of the IEEE/CVF Conference on Computer Vision and Pattern Recognition (CVPR), 2019, pp. 12697-12705.

Ma et al., "Image and video compression with neural networks: A review," IEEE Transactions on Circuits and Systems for Video Technology, Jun. 2020, 30(6):1683-1698.

Mentzer et al., "Practical full resolution learned lossless image compression," Proceedings of the IEEE/CVF conference on computer vision and pattern recognition, 2019, pp. 10629-10638.

Qi et al., "Pointnet: Deep learning on point sets for 3D classification and segmentation," Proceedings of the IEEE conference on computer vision and pattern recognition, 2017, pp. 652-660.

Que et al., "VoxelContext-Net: An octree based framework for point cloud compression," Proceedings of the IEEE/CVF Conference on Computer Vision and Pattern Recognition, 2021, pp. 6042-6051.

Schnabel et al., "Octree-based point-cloud compression," Eurographics Symposium on Point-Based Graphics, 2006, 11 pages.

Sun et al., "Scalability in perception for au-tonomous driving: Waymo open dataset," Proceedings of the IEEE/CVF Conference on Computer Vision and Pattern Recognition, 2020, pp. 2446-2454.

Tian et al., "Geometric distortion metrics for point cloud compression," 2017 IEEE International Conference on Image Processing (ICIP), Sep. 17-20, 2017, pp. 3460-3464.

Toderici et al., "Full resolution image compression with recurrent neural networks," Proceedings of the IEEE Conference on Computer Vision and Pattern Recognition, 2017, pp. 5306-5314.

Townsend et al., "Hilloc: Lossless image compression with hierarchical latent variable models," CoRR, Dec. 20, 2019, arXiv:1912.09953, 14 pages.

Tu et al., "Point cloud compression for 3D lidar sensor using recurrent neural network with residual blocks," 2019 International Conference on Robotics and Automation (ICRA), May 20-24, 2019, pp. 3274-3280.

Van Beek, "Image-based compression of lidar sensor data," Electronic Imaging, Jan. 2019, 2019(15):43-1.

Van den Oord et al., "Conditional image generation with pixelcnn decoders," Advances in Neural Information Processing Systems 29, 2016, 9 pages.

Wiesmann et al., "Deep compression for dense point cloud maps," IEEE Robotics and Automation Letters, Apr. 2021, 6(2):2060-2067.

Yan et al., "Deep autoencoder-based lossy geometry compression for point clouds," CoRR, Apr. 18, 2019, arXiv:1905.03691, 8 pages.

Zhou et al., "Open3d: A modern library for 3D data processing," CoRR, Jan. 30, 2018, arXiv:1801.09847, 6 pages.

* cited by examiner

200

RECEIVE RANGE IMAGE ⟋202

GENERATE QUANTIZED RANGE IMAGE ⟋204

GENERATE PREDICTED QUANTIZED VALUES FOR PIXELS ⟋206

DETERMINE RESIDUAL VALUES ⟋208

ENCODE RESIDUAL VALUES ⟋210

400

RECEIVE BITSTREAM 402

DECODE BITSTREAM TO OBTAIN RESIDUAL VALUES 404

GENERATED PREDICTED QUANTIZED VALUES 406

DETERMINE RECONSTRUCTED QUANTIZED VALUES FROM RESIDUAL VALUES AND PREDICTED QUANTIZED VALUES 408

COMPRESSING LIDAR RANGE IMAGES

CROSS-REFERENCE TO RELATED APPLICATION

This application claims priority to U.S. Provisional Application No. 63/252,612, filed on Oct. 5, 2021. The disclosure of the prior application is considered part of and is incorporated by reference in the disclosure of this application.

BACKGROUND

This specification relates to data compression.

Compressing data refers to determining a representation of the data that occupies less space in a memory. Compressed data may be stored (e.g., in a logical data storage area or physical data storage device), transmitted to a destination over a communications network (e.g., the Internet), or used in any other manner. Generally, the data can be reconstructed (either approximately or exactly) from the compressed representation of the data.

SUMMARY

This specification describes systems implemented as computer programs on one or more computers in one or more locations that can reliably perform data compression and data decompression on lidar range images that are generated from sensor measurements of a lidar sensor that is configured to detect reflections of laser light.

Particular embodiments of the subject matter described in this specification can be implemented so as to realize one or more of the following advantages.

Lidar sensors are widely used in applications such as autonomous driving and augmented reality. However, the large volume of data produced by lidar sensors can lead to high costs in data storage and transmission. While lidar data can be represented as either of two interchangeable representations: 3D point clouds and range images, existing techniques focus on compressing the generic 3D point clouds. The described techniques, on the other hand, directly compress the range images and therefore can leverage the lidar scanning pattern to improve compression quality, e.g., as compared to compressing the unprojected point clouds. In particular, the described techniques demonstrate significant improvement in the compression rate (under the same distortion) compared to widely used point cloud and range image compression algorithms.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
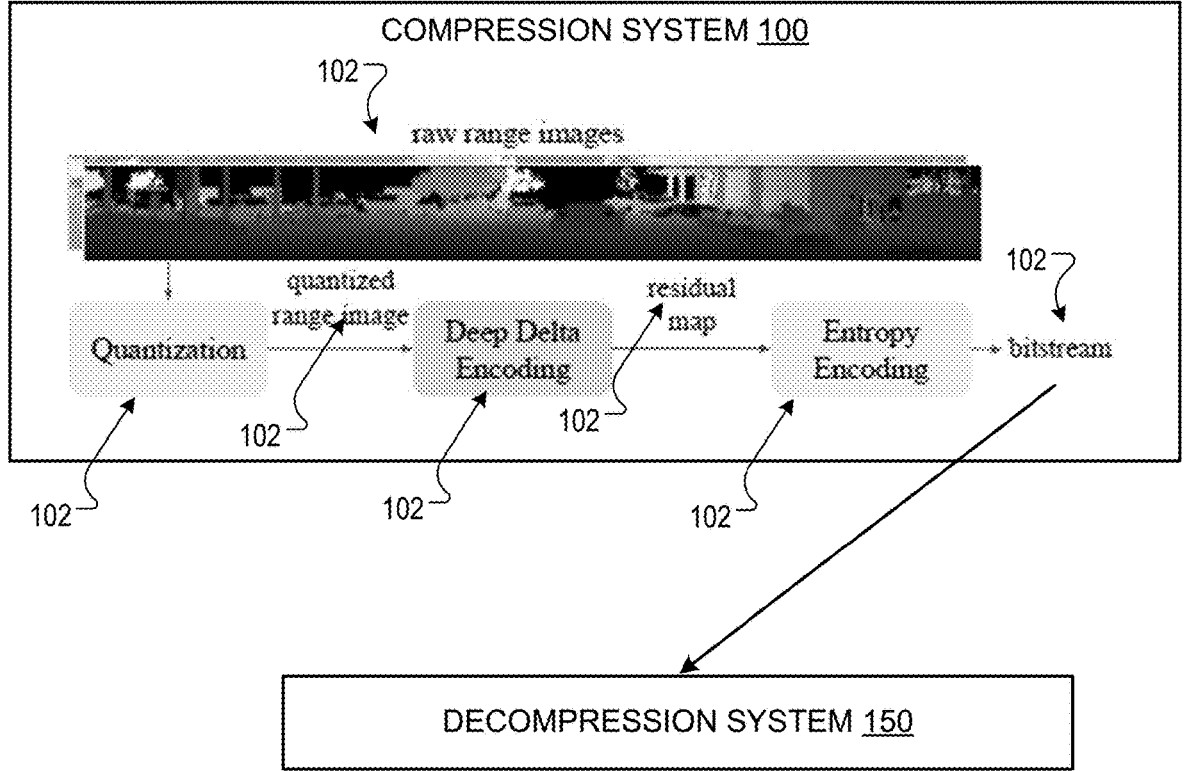
FIG. 1 shows an example compression system and an example decompression system.

This specification describes a compression system implemented as computer programs on one or more computers in one or more locations that compresses a lidar range image generated from sensor measurements of a lidar sensor that is configured to detect reflections of laser light.

This specification also describes a decompression system implemented as computer programs on one or more computers in one or more locations that decompresses a compressed lidar range image to generate a reconstruction of the original lidar range image.

Generally, the compression and decompression systems may be co-located or remotely located, and compressed data generated by the compression system can be provided to the decompression system in any of a variety of ways. For example, the compressed data may be stored (e.g., in a physical data storage device or logical data storage area), and then subsequently retrieved from storage and provided to the decompression system. As another example, the compressed data may be transmitted over a communications network (e.g., the Internet) to a destination, where it is subsequently retrieved and provided to the decompression system.

For example, the lidar range images can be compressed for storage at an autonomous vehicle, robot, or other agent to which the lidar sensor that captured the lidar range images is coupled. That is, the agent can later decompress, i.e., reconstruct, the lidar range image and use the decompressed range image locally, e.g., as input to one or more machine learning models.

As another example, the lidar range images can be compressed for transmission to a remote system from the agent, e.g., over a data communication network. That is, the remote system can later decompress the lidar range images once the compressed lidar range images have been received over the network. The decompressed lidar range images can then be used, e.g., to generate training data for training machine learning models.

A lidar range image generated from sensor measurements includes a plurality of pixels arranged in a two-dimensional grid and includes, for each pixel, a respective value for each of one or more channels. Generally, one of the channels is a range channel that has a value that specifies a range of the location in the environment corresponding to the pixel relative to the lidar sensor. When there are multiple channels, the other channels can include other attributes, e.g., intensity (reflection strength), elongation, second return, and so on.

Generally, each pixel in the range image corresponds to one laser shot, with a specific elevation and azimuth angle of the laser ray. More specifically, the range image is an $H \times W \times C$ image, where H is the number of laser beams in the lidar, W is the number of shots per laser per frame, and C is the number of channels in the range image. Thus, each pixel in the range image corresponds to a shot by one of the lasers of the lidar sensor at the time point corresponding to the frame.

The conversion rule between a point cloud and the range image generated from the point cloud depends on the laser scanning mechanism (the laser shot azimuth and elevation angles) as well as the sensor poses (the 6D pose of the laser sensor at the time of each laser shot). Specifically, in a range image I, given a pixel location (i, j) (which maps to a specific laser shot angle) and its range value r, there is a resulting laser measurement (r, θ, α) where θ (azimuth or yaw) and α (elevation or pitch) are the shot angles for the pixel location relative to the lidar sensor coordinate. This laser measurement can be converted to a point p in the sensor coordinate as follows:

$$p = (x, y, z) = (r \cos\alpha \cos\theta, r \cos\alpha \sin\theta, r \sin\alpha)$$

At the time t of each laser shot, the sensor pose [R|t] (rotation and translation in the global coordinate) can be different. To aggregate the shots into a point cloud, a system can convert the points to a shared global coordinate system to get the point set $$P = \{R_i p_i^T + t_i\}, i = 1, ..., N\}$$

where N is the total number of points and i is the index of the laser shot in a scan.

Reversely, given the point cloud P of a scan (in the global coordinate), to convert it to the range image, the system first transforms each point to the sensor coordinate corresponding to the time t of the shot. Then, the system can obtain (r, θ, α) by the reverse process of the above equation, which then maps back to the row and column indices.

Thus, because a range image can be transformed into a point cloud and a point cloud can be transformed into a range image without loss of information, by compressing the range image, the system can use the reconstruction of the range image to generate a reconstruction of the underlying point cloud.

FIG. 1 shows an example of a compression system 100 and a decompression system 150.

As described above, the compression system 100 is implemented as computer programs on one or more computers in one or more locations and compresses a lidar range image generated from sensor measurements of a lidar sensor that is configured to detect reflections of laser light.

The decompression system 150 is implemented as computer programs on one or more computers in one or more locations and decompresses a compressed lidar range image to generate a reconstruction of the original lidar range image.

In particular, the compression system 100 receives raw range images 102. For example, each raw range image 102 can correspond to a different scan by a lidar sensor.

The system 100 then compresses each raw range image 102 into a compressed representation. A compressed representation is a representation of the data that occupies less space in a memory than the original data. Thus, the compressed representation of the raw range image 102 is a representation that occupies less memory space than the raw range image 102. For example, a given raw range image 102 can be compressed into a bitstream 104, i.e., a sequence of bits, i.e., binary values.

The system 100 can then store the compressed representation, e.g., the bitstream 104, in memory for later access by the decompression system 150 or can transmit the compressed representation to the decompression system 150 over a network connection.

In particular, to generate the compressed representation, the compression system 100 performs quantization 110 on the raw range image 102 to generate a quantized range image 112. To perform quantization 110, the system 100, for each of the one or more channels, quantizes the respective values for the channel for each of the pixels to generate a respective quantized value for the channel for each of the pixels. Thus, the quantized range image 112 includes a respective quantized value for each channel of each pixel of the raw range image 102.

The system 100 then performs "deep delta encoding" 120 on the quantized range image 112 to generate a residual map 122.

Performing deep delta encoding 120 refers to using a neural network to generate, for each pixel in the range image, a predicted quantized value for each channel for the pixel and then generating the residual map 122 by determining, for each pixel in the range image and for each channel of the pixel, a residual ("delta") value between (i) the predicted quantized value for the channel for the pixel and (ii) the quantized value for the channel for the pixel in the quantized range image 112.

Thus, the residual map 122 includes, for each channel of each pixel, a respective residual value. As the residual values are smaller and more concentrated in distribution than the original pixel values, they can be compressed more effectively.

The system then performs entropy encoding 130 on the residual values in the residual map 122 to generate the compressed representation of the raw range image 102, e.g., to generate the bitstream 104.

The system can use any appropriate entropy encoding technique to encode the residual values, i.e., can use any appropriate entropy encoder to leverage the sparsity pattern in the residual map 122 to compress the map 122.

As one example, the system 100 can represent the residuals using a sparse representation, i.e., by specifying the values of the nonzero residuals in the residual map 122 and their indices in the residual map 122. The system 100 can then apply arithmetic encoding on the sparse representation to further reduce its size, i.e., to map the sparse representation into the compressed representation.

As another example, the system 100 can represent the residual values using run-length encoding. This can achieves better compression rates when the residuals are not very sparse, e.g., when the quantization step employed to generate the quantized values is small. After obtaining the run-length representation, the system 100 can use a compressor, e.g., the LZMA compressor, to further reduce its size, i.e., to map the run-length representation into the compressed representation.

At a high level, the neural network used by the system 100 to perform deep delta encoding 120 is configured to generate a predicted quantized value for a given channel of a given pixel conditioned at least on quantized values of other pixels in the quantized range image, i.e., quantized values of other pixels within the given channel and, optionally, quantized values of other pixels within other channels (if the range image 102 has multiple channels).

In some implementations, the system 100 performs intra-frame compression and the predicted quantized values only depend on the quantized values of other pixels within the range image 102.

In some other implementations, the system 100 performs multi-frame compression and the predicted quantized values also depend on quantized values of pixels within one or more other range images 102, e.g., on pixels in a previous range image 102 that corresponds to a lidar scan at an earlier time point.

Predicting quantized values for pixels in a range image will be described in more detail below with reference to FIGS. 2 and 3.

The decompression system 150 receives the compressed representation, e.g., the bitstream 104, and decompresses the compressed representation to generate a reconstruction of the raw range image 102.

Decompressing a compressed representation of a raw range image 102 will be described in more detail below with reference to FIG. 5.

The decompression system 150 can then operate on the reconstruction of the raw range image 102 or, as described above, map the reconstruction to a reconstruction of the point cloud corresponding to the raw range image 102.

Figure 2:
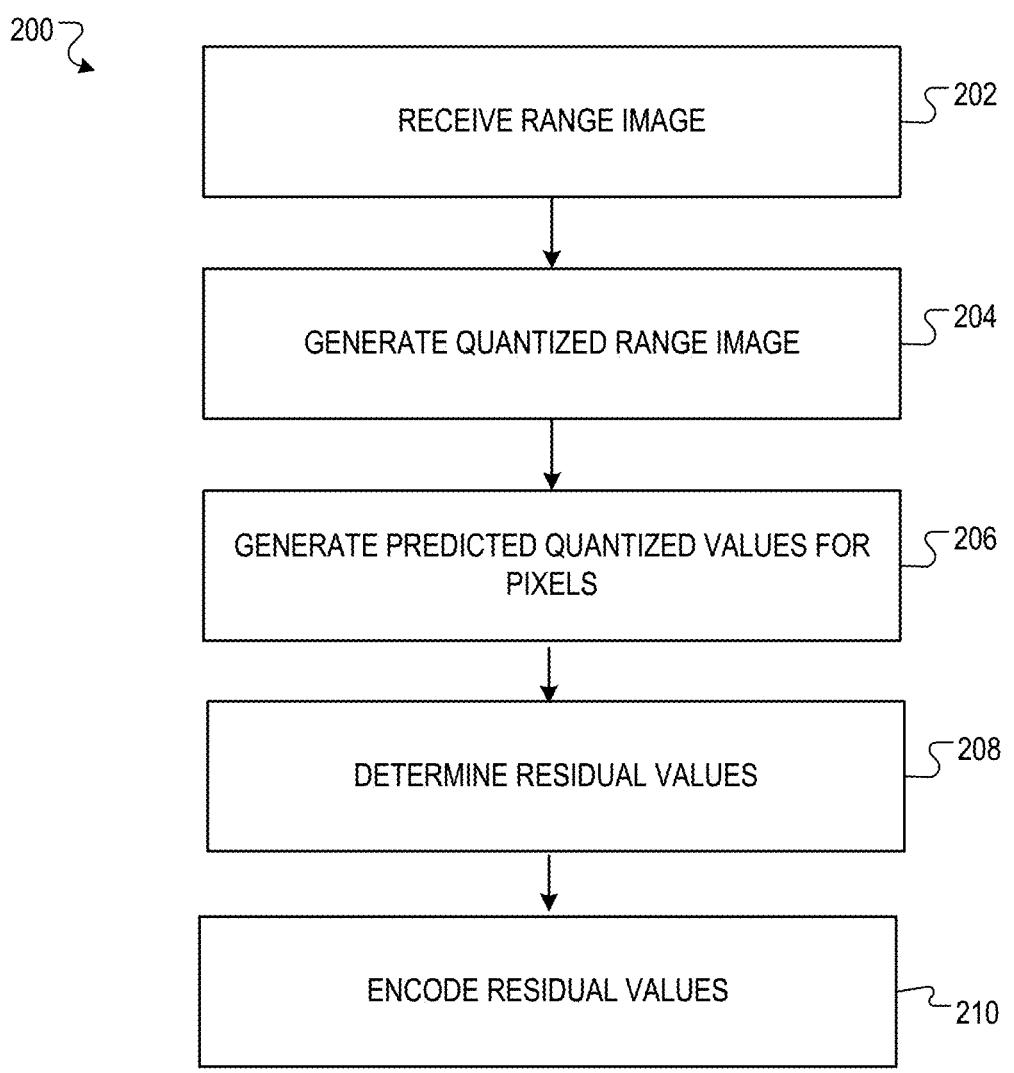
FIG. 2 is a flow diagram of an example process for generating a compressed representation of a range image.

FIG. 2 is a flow diagram of an example process 200 for compressing a range image. For convenience, the process 200 will be described as being performed by a system of one or more computers located in one or more locations. For example, a compression system, e.g., the compression 100 of FIG. 1, appropriately programmed in accordance with this specification, can perform the process 200.

The system receives a range image (step 202). The range image is generated from a lidar sensor measurement of an environment by a lidar sensor, i.e., from a point cloud that includes points generated by a scan of the environment by the lidar sensor. The range image includes a plurality of pixels arranged in a two-dimensional grid and has, for each pixel, a respective value for each of one or more channels. The one or more channels include a range channel having a range value characterizing a range of the location in the environment corresponding to the pixel relative to the lidar sensor and, optionally, one or more additional channels.

The system generates a quantized range image from the range image (step 204). In particular, for each of the one or more channels, the system quantizes the respective values for the channel for each of the pixels to generate a respective quantized value for the channel for each of the pixels. As used in this specification, quantizing a value refers to approximating the value using a value from a reduced set of values. That is, the original values are generated in a number format, e.g., floating point, that has a larger set of possible values than the number format used to represent the quantized values. For example, the encoded values can be represented in an 8-bit number format while the quantized values can be constrained to take only take a value from a set of 9, 14, 21, or 29 quantization levels. For example, the system can quantize a given value by multiplying the value by a scaling factor to generate a scaled factor, rounding the scaled factor to the nearest integer, and then dividing the rounded value by the scaling factor to generate the quantized value.

The system then generates a compressed representation of the range image from the quantized range image by performing steps 206-210 for each of the one or more channels of the range image.

In some implementations, the system performs the steps 206-210 for the entire range image. In these implementations, the "range image" referred to below is the entire range image. In some other implementations, the system divides the original range image into blocks and then performs steps 206-210 for each of the blocks, i.e., to generate a respective compressed representation of each the blocks. In these implementations, the "range image" referred to below is a block of the larger range image. In some of these implementations, the system can perform step 206-210 in parallel for each of the multiple blocks.

In particular, the system generates, for each pixel in the range image, a predicted quantized value for the channel for the pixel conditioned at least on quantized values of other pixels in the quantized range image (step 206).

In particular, the system processes the pixels from the range image according to a pixel order to generate the respective predicted quantized values, such that the respective predicted quantized value for each pixel is based at least on the quantized values for the channel for one or more pixels in the quantized range image that precede the pixel in the pixel order. For example, the pixel order can be a raster scan order through the quantized range image.

As a particular example, the system can generate the predicted quantized value for a given pixel by generating a model input for a neural network and then processing the model input using the neural network to generate the predicted quantized value.

That is, the neural network is configured to receive as input the model input and to generate an output that defines the predicted quantized value.

As one example, the output can be a probability distribution over possible quantized values and the system can select the predicted quantized value by selecting the value with the highest probability or by sampling from the distribution. However, uncertainty caused by the multi-modal distribution of attributes, especially on the object boundaries, within the point cloud can prevent this type of output from generating accurate predicted values.

Therefore, as another example, the neural network can instead predict which pixel in the local quantized range image patch is closest in value to the particular pixel and regress a residual attribute with respect to the value of the pixel that is closest in value. In other words, the output can include a probability distribution over the other pixels in the image patch, i.e., the $h \times w-1$ values other than the given pixel, and a regressed value for each other pixel that represents the predicted difference between the quantized value for the other pixel and the predicted quantized value for the given pixel. The system can then select one of the other pixels using the probability distribution and apply the regressed value for the selected pixel to the quantized value for the selected pixel to generate the predicted quantized value for the given pixel.

To generate the model input for a given pixel, the system generates a local quantized range image patch of the quantized range image for the given pixel. The image patch includes at least the quantized values for the channel for the pixels in the local quantized range image other than the particular pixel. Each pixel in the local quantized range image patch precedes the given pixel in the pixel order.

As a particular example, the system can generate an $h \times w$ image patch, where h and w are fixed and the given pixel is the pixel in the bottom right of the image patch. In some implementations, when the given pixel is near the edge of the range image, i.e., there are fewer than h pixels above the given pixel in the range image or fewer than w pixels to the left of the given pixel in the range image, the system can added zero padded values so that the image patch has dimensions $h \times w$.

The system then generates the model input from at least the local quantized range image patch.

As one example, the neural network can be a fully connected neural network and the model input can be a flattened version of the local quantized range image patch, i.e., the quantized values for the pixels in the quantized range image patch arranged into a vector according to a specified order.

As another example, the neural network can be a convolutional neural network and the model input is the local quantized range image patch represented as an image, i.e., the quantized values for the pixels in the quantized range image patch arranged into a two-dimensional grid.

As another example, the neural network can be a point cloud neural network and the model input can be a point cloud generated from the local quantized range image patch. That is, each point in the point cloud can correspond to one of the pixels in the local quantized range image patch. The point cloud neural network can be any appropriate neural network that is configured to process points from a point cloud. For example, the neural network can be a PointNet or PointPillars based neural network. As another example, the neural network can be a RSN or StarNet based neural network.

In some implementations, the system performs intra-frame compression and the model input does not depend on any pixels in any other range images other than the current range image.

In some other implementations, the system performs multi-frame compression and the model input also depends on pixels in one or more previous range images.

As a particular example, the model input can also depend on pixels from an image patch at the same position, i.e., the same rows and columns, as the image patch in an earlier range image, i.e., a range image representing a scan by the same lidar sensor but at an earlier time point than the current range image. However, this approach does not take the ego-motion of the lidar sensor into account. As the lidar moves over time, the range image patch with the same rows and columns can correspond to vastly different physical space.

As another particular example, to account for the above issue, the system can instead query neighbors for the given pixel from the earlier range image in a three-dimensional coordinate space.

This is described in more detail below with reference to FIG. 3.

When there are multiple channels, the system can generate predicted quantized values for the channels in any of a variety of ways.

In some implementations, the system maintains a separate neural network for each channel.

In some of these implementations, the neural network for each channel predicts quantized values conditioned only on values of the context pixels for that channel, i.e., without considering values for other channels of the context pixels.

In others of these implementations, the neural network for each channel predicts quantized values conditioned on all of the values for all of the channels for the context pixels. In some of these implementations, the channels are arranged according to a channel order and the local quantized range image patch also includes the quantized values for any other channels in the one or more channels that are before the channel in the channel order for the particular pixel.

In some other implementations, there is a single neural network for all of the channels. In some of these implementations, the single neural network predicts, for each channel, quantized values conditioned only on values of the context pixels for that channel, i.e., the model input includes only quantized values for a single channel. In others of these implementations, the single neural network predicts all of the values for all of the channels of a given pixel in parallel given the values for all of the channels of the context pixels, i.e., the model input includes quantized for all channels for the context pixels. In yet others of these implementations, the channels are arranged according to a channel order and the neural network predicts one channel at a time, with the local quantized range image patch for predicting a given channel of a given pixel including the values for all of the channels of the context pixels and also the quantized values for the given pixel for any other channels that are before the given channel in the channel order.

The system determines, for each pixel in the range image, a residual value between (i) the predicted quantized value for the channel for the pixel and (ii) the quantized value for the channel for the pixel (step 208).

The system then encodes the residual values for the pixels in the range image to generate a bitstream for the channel (step 210). For example, the system can perform the encoding using entropy encoding, as described above with reference to FIG. 1.

Figure 3:
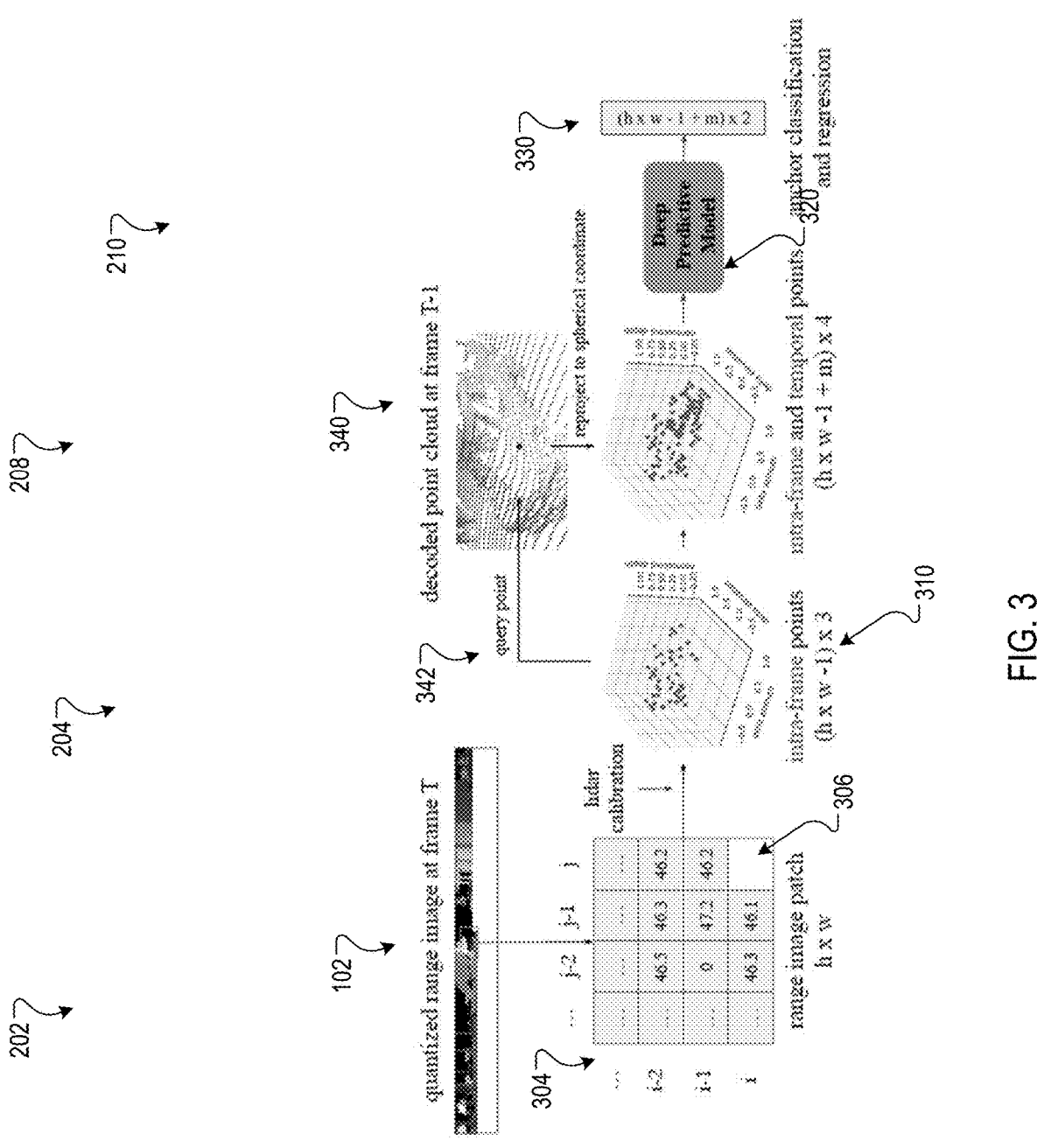
FIG. 3 is a diagram that shows the prediction of a quantized value for a given channel of a given pixel.

FIG. 3 shows an example of generating a predicted quantized value for a particular pixel 306 from a range image 102.

In particular, FIG. 3 shows an example when the system represents a patch 304 of the range image 102 as a point cloud 310 and processes a model input derived from the point cloud using a neural network ("deep predictive model") 320 to generate an output 330 for performing anchor classification and regression. In particular, the output 330 includes a respective probability for each of the pixels ("points") represented in the model input and a respective regressed value for each of the pixels, as described above. Thus, when there are (h×w−1+m) pixels represented in the model input, the output 330 includes (h×w−1+m)×2 values.

In particular, in the example of FIG. 3, the patch 304 is an h×w patch from the range image 102 that has the particular pixel 306 at the bottom right hand corner.

As can be seen in FIG. 3, the system performs lidar calibration to map each pixel in the patch 304 (other than the particular pixel 306) to a three-dimensional point. As described above, the system can map each pixel within the image 102 to a three-dimensional point in spherical coordinates (r, θ, α) where r is the range for the pixel (during encoding, the quantized range value and, during decoding, the reconstructed quantized range value), θ is azimuth or yaw and α elevation or pitch are the shot angles for the pixel location relative to the lidar sensor coordinate. Thus, the system generates h×w−1 "intra-frame" points. In some implementations, i.e., when performing intra-frame compression, the system provides only these intra-frame points as input to the neural network 320.

In some other implementations, however, the system also uses pixels from an earlier point cloud 340 when generating the model input. The point cloud 340 corresponds to an earlier range image, i.e., can be generated from the range image captured at time T−1 or converted into the range image captured at time T−1.

In particular, the system generates a query point 342 to obtain m points corresponding to the query point 342 from the point cloud 340. In particular, the m points are the neighboring points to the point corresponding to the pixel 306 in the point cloud 340. In particular, because the quantized range value for the pixel 306 are not known during decoding, the system uses a predicted quantized range value for the pixel to map the pixel to spherical coordinates and then to a point 342 (x, y, z) in the global coordinate system as described above. The system then identifies the m neighbors to the query point in the point cloud 240, i.e., the m nearest points to the query point 342, and maps the m points back to spherical coordinates in order to represent them in the same coordinate system as the h×w−1 intra-frame points.

That is, the system then reprojects the m points to spherical coordinates to generate a combined set of points that includes (h×w−1+m) points. To allow the neural network to differentiate between points corresponding to the image 102 and points corresponding to the point cloud 340, the system can augment each point with an additional channel that contains a binary value that identifies whether the point is from the image 102 or the point cloud 340.

Figure 4:
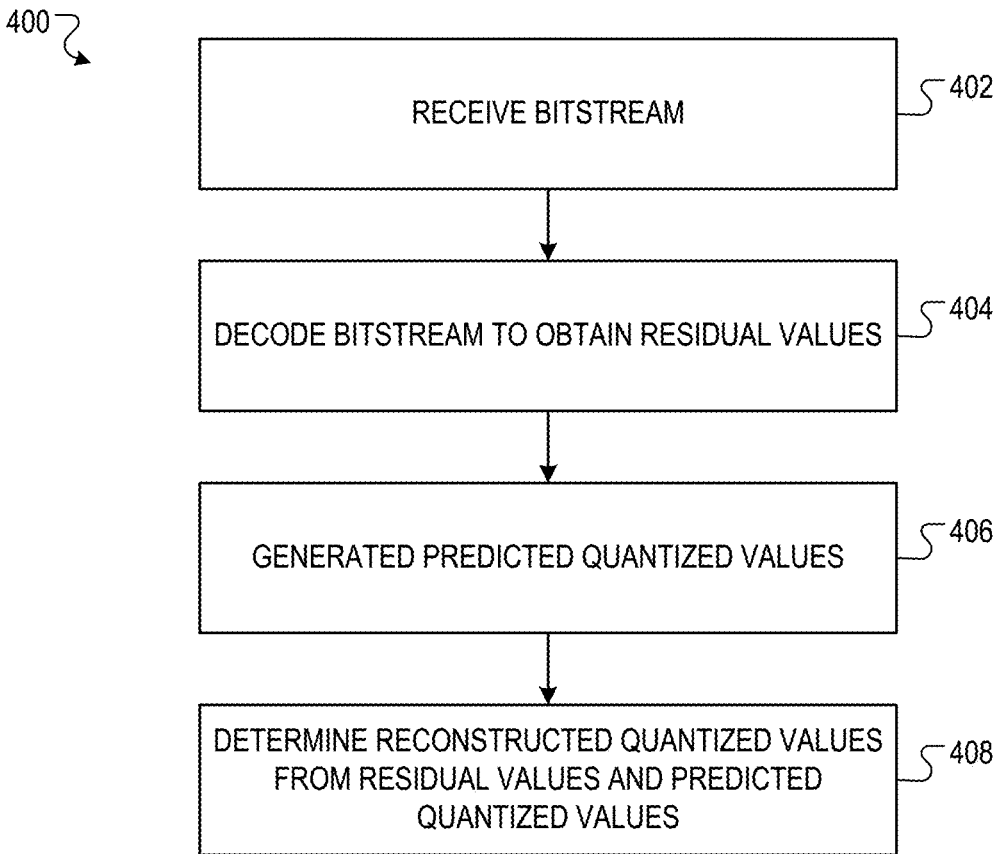
FIG. 4 is a flow diagram of an example process for decompressing a range image.

FIG. 4 is a flow diagram of an example process 400 for reconstructing a range image. For convenience, the process 400 will be described as being performed by a system of one or more computers located in one or more locations. For example, a decompression system, e.g., the decompression system 150 of FIG. 1, appropriately programmed in accordance with this specification, can perform the process 400.

The system receives a compressed representation of a range image. For example, the system can access the compressed representation from a memory or can receive the compressed representation over a network from a compression system.

Generally, the compressed representation includes a respective bitstream for each of the one or more channels in the range image that encodes the quantized values for that channel for the pixels of the range image. The system then performs steps 402-410 for each channel to generate reconstructed values for the range image for the channel.

In some implementations, the system performs the steps 402-410 for the entire range image. In these implementations, the "range image" referred to below is the entire range image. In some other implementations, the system divides the original range image into blocks and then performs steps 402-410 for each of the blocks, i.e., to reconstruct a respective compressed representation of each the blocks. In these implementations, the "range image" referred to below is a block of the larger range image. In some of these implementations, the system can perform step 402-410 in parallel for each of the multiple blocks.

The system receives a bitstream for the channel (step 402).

The system decodes the bitstream to obtain residual values for the pixels in the range image for the channel (step 404). Generally, the system applies the decoding scheme that corresponds to the encoding scheme that was used to encode the range image. For example, the system can use entropy coding as described above to decode the bitstream.

The system processes the pixels from the range image according to a pixel order to generate a respective predicted quantized value for each of the pixels. Generally, the pixel order is the same as the one described above and the same as the one used when encoding the range image, i.e., so that the predicted quantized values for the pixels are dependent on the same context both when compressing and decompressing the range image.

In particular, for each pixel, the system generates a respective predicted quantized value for the channel for the pixel based at least on reconstructed quantized values for the channel for one or more pixels in the range image that precede the pixel in the pixel order (step 406). That is, the system generates the predicted quantized value using a neural network as described above, but instead of using the actual quantized values of the other pixels for context, the system uses already reconstructed quantized values for context (in place of the actual quantized values). In other words, because the same pixel order is used for both compression and decompression, the system has access to a respective reconstructed predicted quantized value for each context pixel that was used to generate the predicted quantized value and can use these reconstructed predicted quantized values to generate the model input for the neural network as described above.

The system then determines a reconstructed quantized value for the pixel for the channel from the residual value for the pixel for the channel and the predicted quantized value for the pixel for the channel (step 408). That is, the system can add the residual value and the predicted quantized value to generate the reconstructed quantized value.

By performing the process 400 the system generates a lossless reconstruction of the quantized range image. That is, the only compression loss between the reconstruction of the range image and the original range image is the loss incurred by virtue of quantizing the values of the pixels prior to compressing the range image.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
obtaining a range image generated from a lidar sensor measurement of an environment by a lidar sensor, the range image comprising a plurality of pixels arranged in a two-dimensional grid and including, for each pixel, a respective value for each of one or more channels, the one or more channels including a range channel having a range value characterizing a range of the location in the environment corresponding to the pixel relative to the lidar sensor;
generating a quantized range image, comprising, for each of the one or more channels, quantizing the respective values for the channel for each of the pixels to generate a respective quantized value for the channel for each of the pixels; and
generating a compressed representation of the range image, comprising, for each channel:
generating, for each pixel in the range image, a predicted quantized value for the channel for the pixel conditioned at least on quantized values of other pixels in the quantized range image;
determining, for each pixel in the range image, a residual value between (i) the predicted quantized value for the channel for the pixel and (ii) the quantized value for the channel for the pixel; and
encoding the residual values for the pixels in the range image to generate a bitstream for the channel.

2. The method of claim 1, wherein the range image is one of a plurality of image blocks of a larger range image, and wherein the method further comprises generating compressed representations of each of the other image blocks of the plurality of image blocks.

3. The method of claim 2, wherein generating compressed representations of the other image blocks of the plurality of image blocks comprises generating the compressed representations of the other image blocks in parallel with generating the compressed representation of the range image.

4. The method of claim 1, further comprising:
storing the compressed representation.

5. The method of claim 1, further comprising:
transmitting the compressed representation over a data communication network to a remote system.

6. The method of claim 1, wherein encoding the residual values for the pixels in the range image comprises:
encoding the residual values using an entropy encoding scheme.

7. The method of claim 1, wherein generating the quantized range image comprises:
adding additional pixels to the range image by zero padding the range image.

8. The method of claim 1, wherein:
generating, for each pixel in the range image, a predicted quantized value for the channel for the pixel conditioned at least on quantized values of other pixels in the quantized range image comprises:
processing the pixels from the range image according to a pixel order to generate the respective predicted quantized values, wherein the respective predicted quantized value for each pixel is based at least on the quantized values for the channel for one or more pixels in the quantized range image that precede the pixel in the pixel order.

9. The method of claim 8, wherein the pixel order is a raster scan order through the quantized range image.

10. The method of claim 8, wherein processing the pixels from the range image according to a pixel order to generate the respective predicted quantized values comprises, for each particular pixel:
generating a local quantized range image patch of the quantized range image for the pixel that includes at least the quantized values for the channel for the pixels in the local quantized range image patch other than the particular pixel, wherein each pixel in the local quantized range image other than the particular pixel precedes the particular pixel in the pixel order;
generating, from the local quantized range image patch, a model input to a neural network; and
processing the model input using the neural network to generate the predicted quantized value for the particular pixel.

11. The method of claim 10, wherein the neural network is the same for all of the one or more channels.

12. The method of claim 10, wherein there are a plurality of channels and each channel has a different corresponding neural network.

13. The method of claim 10, wherein the local quantized range image patch also includes the quantized values for the other channels in the one or more channels for the pixels in the range image patch other than the particular pixel.

14. The method of claim 13, wherein the channels are arranged according to a channel order and the local quantized range image patch also includes the quantized values for any other channels in the one or more channels that are before the channel in the channel order for the particular pixel.

15. The method of claim 10, wherein the neural network is a fully connected neural network and the model input is a flattened version of the local quantized range image patch.

16. The method of claim 10, wherein the neural network is a convolutional neural network and the model input is the local quantized range image patch represented as an image.

17. The method of claim 10, wherein the neural network is a point cloud neural network and the model input is a point cloud generated from the local quantized range image patch.

18. The method of claim 17, wherein the point cloud comprises a plurality of first points that each correspond to one of the pixels in the local quantized range image patch.

19. The method of claim 18, wherein the point cloud comprises a plurality of second points that each correspond to one of a plurality of pixels in an earlier range image captured at an earlier time point than the range image.

20. The method of claim 10, wherein the neural network predicts which pixel in the local quantized range image patch is closest in value to the particular pixel and regresses a residual attribute with respect to the value of the pixel that is closest in value.

21. The method of claim 1, wherein generating, for each pixel in the range image, a predicted quantized value for the channel for the pixel conditioned at least on quantized values of other pixels in the quantized range image comprises:

generating, for each pixel in the range image, a predicted quantized value for the channel for the pixel conditioned at least on quantized values of other pixels in the quantized range image and quantized values of pixels in an earlier range image captured at an earlier time point than the range image.

22. A system comprising one or more computers and one or more storage devices storing instructions that when executed by one or more computers cause the one or more computers to perform operations comprising:

obtaining a range image generated from a lidar sensor measurement of an environment by a lidar sensor, the range image comprising a plurality of pixels arranged in a two-dimensional grid and including, for each pixel, a respective value for each of one or more channels, the one or more channels including a range channel having a range value characterizing a range of the location in the environment corresponding to the pixel relative to the lidar sensor;

generating a quantized range image, comprising, for each of the one or more channels, quantizing the respective values for the channel for each of the pixels to generate a respective quantized value for the channel for each of the pixels; and generating a compressed representation of the range image, comprising, for each channel:

generating, for each pixel in the range image, a predicted quantized value for the channel for the pixel conditioned at least on quantized values of other pixels in the quantized range image;

determining, for each pixel in the range image, a residual value between (i) the predicted quantized value for the channel for the pixel and (ii) the quantized value for the channel for the pixel; and encoding the residual values for the pixels in the range image to generate a bitstream for the channel.

23. One or more non-transitory storage media storing instructions that when executed by one or more computers cause the one or more computers to perform operations comprising:

obtaining a range image generated from a lidar sensor measurement of an environment by a lidar sensor, the range image comprising a plurality of pixels arranged in a two-dimensional grid and including, for each pixel, a respective value for each of one or more channels, the one or more channels including a range channel having a range value characterizing a range of the location in the environment corresponding to the pixel relative to the lidar sensor;

generating a quantized range image, comprising, for each of the one or more channels, quantizing the respective values for the channel for each of the pixels to generate a respective quantized value for the channel for each of the pixels; and generating a compressed representation of the range image, comprising, for each channel:

generating, for each pixel in the range image, a predicted quantized value for the channel for the pixel conditioned at least on quantized values of other pixels in the quantized range image;

determining, for each pixel in the range image, a residual value between (i) the predicted quantized value for the channel for the pixel and (ii) the quantized value for the channel for the pixel; and encoding the residual values for the pixels in the range image to generate a bitstream for the channel.

* * * * *